Oct. 9, 1934.  A. CAPROTTI  1,976,325
POPPET VALVE GEAR
Filed Feb. 25, 1930  2 Sheets-Sheet 1
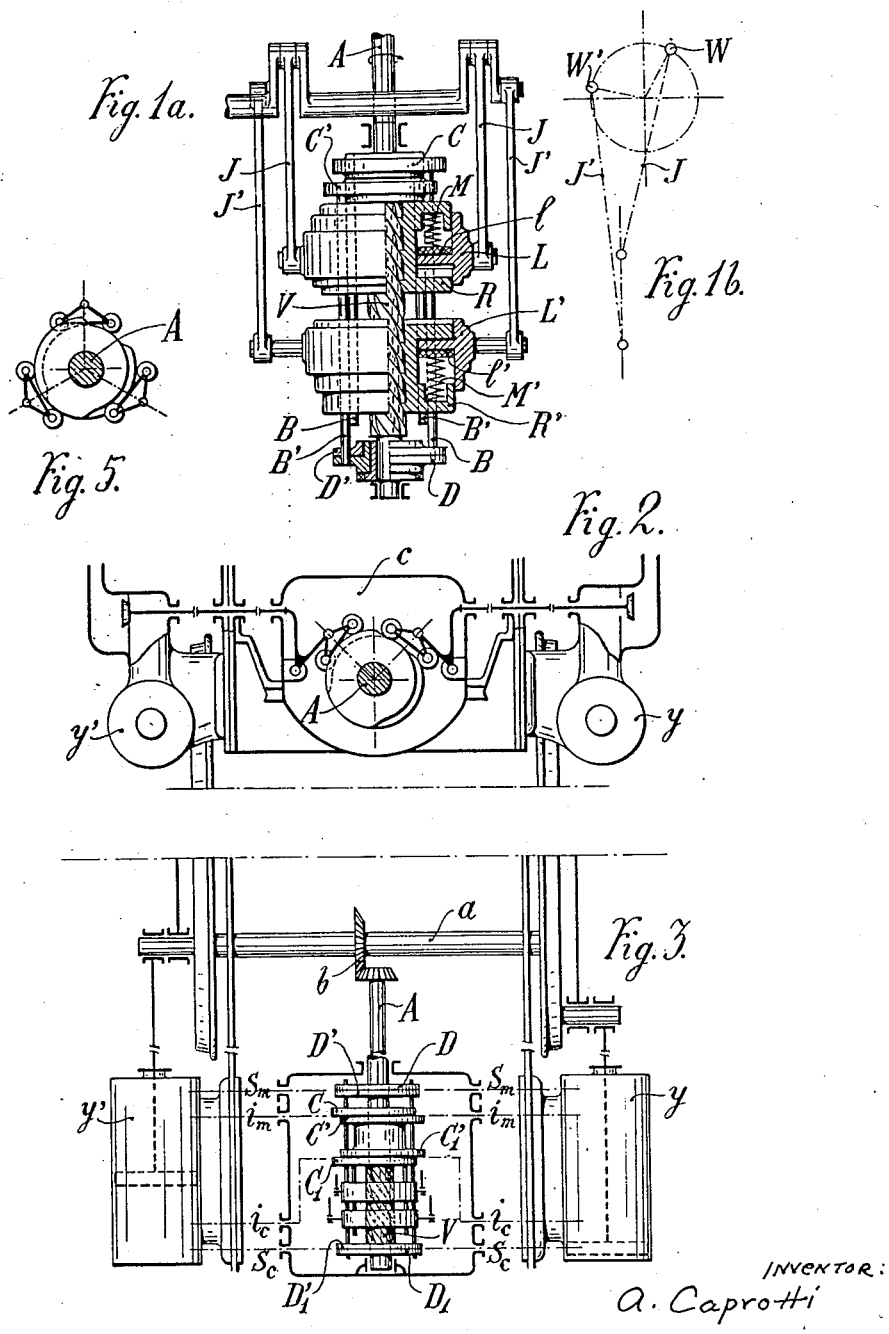

Oct. 9, 1934.  A. CAPROTTI  1,976,325
POPPET VALVE GEAR
Filed Feb. 25, 1930   2 Sheets-Sheet 2
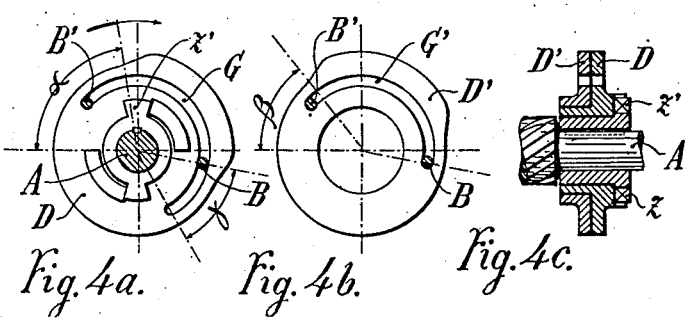
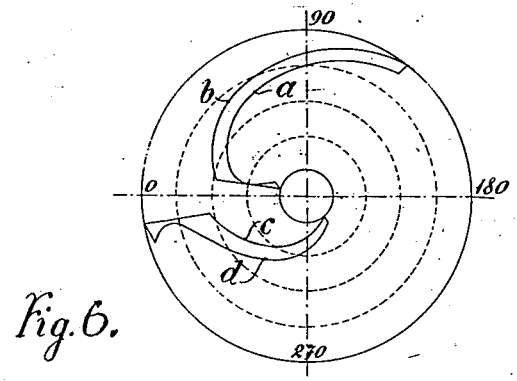
INVENTOR:
A. Caprotti Patented Oct. 9, 1934

1,976,325

UNITED STATES PATENT OFFICE 1,976,325

POPPET VALVE GEAR

Arturo Caprotti, Milan, Italy

Application February 25, 1930, Serial No. 431,262
In France February 28, 1929

3 Claims. (Cl. 121—127)

Amongst the various known poppet valve gears operated by rotating cams there is one (U. S. Patent No. 1,549,712) in which inlet valves are operated by one lead cam and one cut-off cam having their angular setting variable, controlled by a device in which lost motions are provided to allow the lead to remain constant whilst the cut-off is varied as required. In said poppet-valve gear in order to prevent hammering of the cut-off cam within the limits allowed by the lost motion, the accelerating tangential thrust on the cam profile caused by the closing of the inlet valve is neutralized by placing at 180° to each other the rollers on each cam operating the two inlet valves at the opposite ends of the cylinders, and pressing said rollers on the cam profiles by means of a strong compensating spring acting with proper leverage.

This construction, as claimed in the above mentioned patent, to prevent hammering of the cut-off cam, has very unfavourable consequences on the operation of the engine, as, apart from the complication of compensating springs and other expedients, and of the impossibility of finding in some cases (heavy valves and very high speeds) room enough for efficient compensating springs, requiring also large bearing surfaces to transmit their efforts, the sole necessity of placing the rollers on the cam at opposed ends of a diameter compels the designer to arrange the valves by pairs and foregoes all independence of operation of the same.

Now, a whole range of very useful constructive and operating possibilities, which otherwise could be taken into consideration and embodied in the valve gear, are in this way put out of the question altogether, due to the rather close constraints and bonds to which the members of a valve gear operating in this manner are subjected. Thus it often happens that certain important applications of this valve gear are made impossible.

The present invention relates to a poppet valve gear with rotating cams with a variable cam setting presenting the absolutely new feature that the above mentioned rollers can be placed in any desired position on the profile operating the valves independently one from another, as any hammering of the cut-off cam is prevented by other means than balancing the above accelerating forces; so that this diametrically opposed arrangement of the rollers, mentioned above, can be dispensed with. Thus a number of improvements of valve events and possibilities of applications to multiple cylindered engines, heretofore excluded, are obtained, all of them originating and depending from the new means preventing the hammering of the cut-off cam, as will be disclosed hereinafter.

Whilst heretofore the accelerating thrusts due to the closing of the valves have been counterbalanced with the above mentioned compensating springs, according to the present invention on the contrary, the cam operating the cut-off is not only allowed to follow freely and directly such accelerating efforts, but is also helped to maintain the most advanced position in the direction of its rotation position to which it is pushed by said efforts.

Figures 1a and 1b represent one embodiment of the basic inventive idea:

Figures 2, 3 and 5 illustrate the embodiment of the invention in the case of a multicylinder engine;

Figures 4a, 4b, and 4c illustrate a detail of the exhaust cam of the mechanism represented in Figures 1a, 1b;

Figure 6 is a polar diagram illustrating the distribution according to the invention.

Thus, whilst formerly, on reversing the drive (viz. the rotation of the engine), the cut-off cam, on assuming its new function of inlet opening cam, passed from its lagging position in forward motion, to the corresponding lagging position in backward motion, and thus moved through the entire angle corresponding to the lost motion left in the cam-shifting mechanism, in the new valve gear, no shift of the cam occurs, as the extreme leading position of the cut-off cam in forward motion, corresponds exactly to the extreme lagging position of the said cam operating as inlet opening cam in backward motion.

In order to better explain the differences between this invention and the one shown in U.S. Patent No. 1,549,712 which descend from the new position of the cut-off cam in regard to the lost motion that is provided in the cam shifting mechanism, we will refer to a special diagram which we will call "circular" or "polar diagram".

In this diagram the subsequent positions of the reversing mechanism are brought on the horizontal line passing through the pole, so that the whole displacement of the reversing mechanism is represented by the movement of a point between a maximum and a minimum polar radius. For any polar radius, i.e. for any chosen position of the reversing mechanism, we may draw a circle whose centre lays in the pole, and on which we can mark the points laying on vectors forming with the horizontal angles equal to those of the crank from a dead point at the moments in which the subsequent valve events take place. Connecting together the various points representing the same valve event on the subsequent circles, we obtain curves which we will call after the valve event which they represent, i. e., lead, cut-off, release and compression curves.

The polar diagram of the inlet valve events, characteristic of valve gears with double shiftable admission cams after U. S. Patent No.

1,549,712, is the one shown in Fig. 6 of the accompanying drawings, in which the position of the reversing mechanism corresponding to the maximum cut-off in forward motion is represented by the outer circle, whereas the inner circle corresponds to the position of said reversing mechanism with maximum cut-off in backward motion. In this diagram the forward motion is supposed in clockwise direction.

Such a diagram is of the bi-linear type, that is, it contains the two curves $a$ and $b$ giving respectively the crank angle at which the inlet valve closes in forward motion (clockwise) and at which it begins to open in backward motion (counterclockwise), whilst the two curves $c$ and $d$ give respectively the opening position in forward motion and the cut-off in backward motion.

The angular distance between the points of curves $a$ and $b$ situated on the same circle, as well as the angular distance between the similar points of curves $c$ and $d$, correspond to the last motions left in the shifting mechanism, the points of curves $a$ and $c$ corresponding to the lagging position in forward motion, whereas the points of curves $b$ and $d$ correspond to the lagging position in backward motion. The polar diagram for the new valve gear, owing to the fact that both in forward and in backward motion the inlet cam which after the direction of the motion operates as cut-off cam rotates no more in lagging, but always in leading position, which leading position corresponds exactly to the lagging position in opposite motion, is of the mono-linear type, as the cut-off varies no longer, in forward motion, according to the curve $a$, but to the same curve $b$ which represents the law of valve opening in backward motion: similarly, the single curve $c$ represents the single law for valve opening in forward motion and for cut-off in backward motion.

Sometimes the forward thrusts or impulses caused by the closing of the valves are not sufficient for maintaining the cut-off cam constantly in its most advanced position, particularly if the speed of the cam shaft is periodically variable, and if there is abnormal friction and high engine speed. To prevent any possibility of beating, an arrangement is adopted having the tendency to maintain the cut-off cam advanced. Figures 1a and 1b show one of the possible embodiments of such an arrangement.

The cam shaft A which rotates at the same average speed as the driving axle, propels in the direction of the arrow the opening C and cut-off cam C′ which are fitted loose on the shaft and are carried around by means of scrolls R and R′ connected to the cams by rods B, B, B′, B′. These scrolls are screwed on a quick pitch worm V, cut on the cam shaft and are compelled to rotate with it, whilst their longitudinal shift is controlled by collars L and L′ embracing the said scrolls. These collars are shifted through links J, J, J′, J′ by the crank shaft W, W′ controlled by the reversing lever.

All the above arrangement is already known, without exception of the lost motion provided between the scrolls R, R′ and their respective collars L, L′.

In the present invention, between each scroll and its collar is placed a ring $l$, $l'$ respectively and a series of springs M, M′ respectively, the thrust of the latter overcoming the frictional resistances and urging the respective cams in the desired direction (advanced position in cut-off cam and retarded position in opening cam).

Thus the free (springless) lost motion heretofore used is replaced by an elastic lost motion, that is a lost motion which is constantly annulled by the action of springs which are strong enough to maintain the two members that are coupled with lost motion in continuous contact at one end of said lost motion notwithstanding the opposite action of frictional resistances, but becomes available when necessary in order to allow the crank pins W and W′ to rotate in proximity of their dead centres without shifting longitudinally the corresponding scrolls. In effect, through the action of the corresponding lost motion springs, scroll R reaches cam C′ and scroll R′ reaches cam D′ before the corresponding crank pins W and W′ reach their own dead point. Further rotation of crank pins W and W′ is allowed by deflection of corresponding springs M and M′ and during this rotation the longitudinal position of corresponding scrolls R and R′ cannot vary and also the angular setting of corresponding cams C and C′ remains constant. In forward motion and during that part of rotation of crank pins W in which the setting of cam C remains constant, this constant setting means constant lead; in backward motion and during that part of rotation of crank pins W′ in which the setting of cam C′ remains constant, there is also constant lead, corresponding to constant setting of cam C′.

The stable operation of the cut-off cam, in its most advanced position, towards which said cam is pressed by the closure impulses and is secured by elastic lost motion by the device described above, allows a complete independence of the position of the rollers around the profile of the cams. Consequently, it is possible to actuate, with a single pair of admission cams, any number of rockers, each controlling an admission valve (naturally within the limits of overall dimensions of the rocker and reciprocal space available).

The cut-off cam is maintained in its leading position even when the roller rolls up on the high surface of this cam, owing to the smallness of the pressure of the roller on the cam profile during this rolling up, in comparison with the pressure on same cam profile during the descending of same roller from the said high surface, and to the inertia of the rotating masses of the cut-off cam and all mechanical parts rotating with it, driven with lost motion.

As a matter of fact, these masses behave as a free-wheel, and the more heavy are the rotating masses, the less disturbing is a momentary impulse like that of the roller rolling up the high surface of the cam. During the closure of the valve, whilst the roller descends down the high surface of the cam, and therefore said cam is compelled to advance in its rotation, the forces pushing the roller against the cam are the small retrieving force of the roller and corresponding lever and the great retrieving force of the closing valve, whereas during the rolling up of the roller on the high surface of the cam, the inlet valve is pressed against its seats and therefore the only pressure of the roller against the cam profile results the small one of the retrieving spring for roller and lever.

In practice, the proportion between the above forces and the rotating masses is such that during the descending of the roller the cam is energetically pushed into its leading position notwithstanding the retarding friction resistances, whereas the retarding action of the rolling up roller is not sufficient to appreciably displace the same cam from the reached leading position.

At all events, the above described substitution of the free lost motions with spring or elastic lost motions provides to avoid any danger of the cut-off cam leaving its leading position even during the impulses of the rollers rolling up the high surface of said cam.

Whilst the scheme represented by Figures 1a and 1b represents one embodiment of the invention in the case in which one pair of inlet cams operates the two opposite inlet valves f of the same double acting cylinder, it is possible with the same pair of inlet cams to operate inlet valves of different cylinders forming part of the same engine.

Figures 2 and 3 show diagrammatically the case of control from a single pair of admission cams of the two inlet valves cover side or crank side respectively of the two cylinders of the same engine with crank setting at 90°. Figure 5 shows a pair of inlet cams with three swing beams equally spaced at 120° from each other, which can be connected with the corresponding valves to be opened and closed every third of revolution of the engine crank shaft. These three valves can be the cover side or the crank side inlet valves of a three cylinder engine with cranks at 120° from each other. Both in the cases of Figures 2 and 3 and in that of Figure 5, it is essential that the cut-off cam be driven in its leading position, as the driving of such cam in lagging position requires that balancing of the impulses of the closing valves which is characteristic of the above cited U. S. Patent No. 1,549,712, and requires two opposite swing beams operating the two opposite inlet valves of the same cylinder to be placed just opposite each other. In both these cases, there are no opposite swing beams, therefore a lagging position could not be satisfactorily maintained, whilst the leading position as obtained in this invention is independent from the number and relative position of the various swing beams which can be operated by the same pair of inlet cams.

In all piston engines, owing to the inclination of the connecting rod, the movement of the piston from the two dead points is not identical, and at opposite crank positions the displacement of the piston is less from the crank dead point than from the cover dead point.

If the valve events in the two chambers of a double acting cylinder are so controlled that they take place at equal angle of the crank from the two opposite dead points, these valve events are unequal with reference to the cylinder travel.

But if the valve events of the crank side are controlled by other cams than the valve events of the cover side, as both in the cases of Figs. 2 and 3 and in that of Fig. 5, such cams can be made different from each other, so that the identical valve events take place in other than opposite positions of the crank. By a proper difference in the cams, it is possible to satisfactorily correct the differences in valve events with reference to the piston travel from the two dead points.

Figures 2 and 3 represent an embodiment of the invention to operate the valves of cylinders (Y) and (Y') of a locomotive where a single longitudinal cam shaft A is placed between the two cylinders and rotates at the same speed as the crank shaft, being driven through gears b (which may be bevel or helicoidal gears) taking the motion from one of the driving axles of the locomotive.

The shaft A extends to the inside of the box C containing the cams, rockers and levers operating the inlet and exhaust valves of the two cylinders Y and Y'.

$S_c$, $S_m$ represent the common centre lines of the exhaust valves, and $i_c$ and $i_m$ the common centre lines of the inlet valves, cover and crank side respectively, of the said two cylinders. In Figure 2 is shown the relative position, at right angles, of the two rockers controlled by the same pair of cams and operating the correspondent inlet valves (both cover side or crank side) of the cylinders with cranks set at 90°.

In designing the profiles of the pair of cams controlling the crank side valves with a convenient greater amplitude than those of the other pair of cams, it is possible to obtain a cut-off on the crank side of the cylinder with a greater angle from dead centre than the corresponding one at cover side, thus compensating sufficiently the linear difference in the stroke from corresponding dead centres resulting at equal crank angles, and due to the angularity of the connecting rod.

Figure 5 shows how the rockers are arranged around the same pair of cams when operating the three admission valves (cover side or crank side) in an embodiment of the invention to operate the valves of a three cylinder engine with cranks set at 120°: in this valve gear it is equally possible to obtain, in the same way described above, the compensation of the phase displacements due to the angularity of the connecting rod.

Figures 4a, 4b and 4c represent diagrammatically the exhaust cams of the embodiment of the invention represented by Figures 1a and 1b, whereby, on account of the continually advanced position of the cut-off cam, the ratio of compression in the cylinder is decreased at high cut-offs.

To obtain this, to the usual exhaust cam D, carried around invariably by suitable dogs z, z' fixed on cam shaft A during rotation in a given direction, is appended an auxiliary cam D' mounted loose on the hub of the cam D and placed side by side to it, both cams bearing on the same rollers operating the exhaust valves.

The auxiliary cam D' has the same profile as the cam D and comprises a circular slot G' in which enter the ends of rods B', B which are in one piece respectively with the cut-off and inlet opening cam.

The drawings show the cams as they appear in forward motion full gear, revolving in the direction of the arrow: in such a position the rods B', B are at the opposite ends of the slot G' and the closing profile of the auxiliary cam D' is lagging by an angle $\alpha - \beta$ relatively to that of the cam D.

In such conditions the opening of the valve is operated by the cam D driven by dogs z, z' and the closing is allowed by the cam D' which cannot shift forward during the closing period, being prevented by rod B', which in its turn cannot be shifted forward because the cut-off cam connected with it is already in its most advanced position.

On decreasing the cut-off, the rod B' advances in the direction of the arrow and the cam D' which controls the closing of the valve, is shifted angularly forwards by the tangential component of the roller pressure transmitted by the exhaust lever from the closing valve to the closing profile, this shifting being limited by the position of rod B', so that the compression angle increases by the same amount that the cut-off angle diminishes. This continues until the cut-off diminishes by the angle $\alpha-\beta$ as, from this moment on, the profiles of the cams D and D' are superposed and the cam D', being loose, has no action at all, so that the compression remains constant.

In backward motion the rod B assumes the functions rod B' has in forward motion and, at full gear backward, the angle of lag for compression is $\gamma-(\alpha-\beta)$.

With the help of the auxiliary cam described above, one can obtain a very low compression at the highest cut-offs, allowing this compression to increase gradually as the cut-off is reduced, until it reaches its maximum value, for instance when the cut-off is about 50 per cent; with all shorter cut-offs the compression remains constant.

By adopting the auxiliary cam D', the law of variation of the compression is the best obtainable from the point of view of both mechanical and thermodynamic operation.

It will be understood that the embodiment of the invention can be varied as regards details of construction and arrangement to suit any particular character of the engine to which it may be applied and that any purely formal alteration in the above described devices obtaining substantially the results claimed hereafter is to be considered within the limits of the above described invention.

I claim:

1. A valve gear for reversible piston operated elastic fluid engines having two inlet valves and corresponding exhaust valves, said gear comprising a cam shaft, two inlet cams carried by said shaft, one of said cams operating to control the opening of the inlet valves for one direction of operation and the closing for the opposite direction of operation and the other cam operating to control the closing of the valves for the first direction and the opening for the second direction, the two cams being angularly displaceable relative to one another whereby the cut-off can be varied and the motion of the engine can be reversed, regulating means for angularly displacing the said cams, lost motion mechanism operatively connecting the regulating means with the cams, elastic means included in the lost motion mechanism for maintaining the inlet closing cam in its most advanced position and the inlet opening cam in its most lagging position to the extent allowed by said lost motion mechanism, an exhaust cam fixed on the said cam shaft, a hub on the exhaust cam and an auxiliary exhaust cam loosely mounted on said hub, and means operatively connecting said auxiliary exhaust cam to said lost motion mechanism and the advance position of the said cam being limited by the said lost motion mechanism, the said auxiliary exhaust cam controlling the compression and operating in addition to the first mentioned exhaust cam.

2. A valve gear for reversible piston operated elastic fluid engines having two inlet valves and corresponding exhaust valves, said gear comprising two inlet cams, one of said cams operating to control the opening of the inlet valves for one direction of the operation and the closing for the opposite direction of operation and the other cam operating to control the closing of the valves for the first direction and the opening for the second direction, a cam shaft carrying the cams loosely fitted thereon, a screw thread on said cam shaft, two scrolls mounted on said screw thread, operative connections between the scrolls and the respective cams, two shifting collars respectively mounted one on each of said scrolls, a reversing crank shaft, links connecting the cranks of the crank shaft to the shifting collars on the scrolls, a lost motion mechanism between each of said collars and each scroll, elastic means between the collars and the scrolls for maintaining the inlet closing cam in its most advanced position and the inlet opening cam in its most lagging position to the extent allowed by the said lost motion mechanism, rollers arranged around the inlet cams, levers connecting the rollers to the respective valves and pressing the rollers against the cam profiles with the full forces caused by the motion of the valves, an exhaust cam carried by said cam shaft, a hub on the exhaust cam, an auxiliary exhaust cam controlling the compression and loosely mounted on said hub, and means operatively connecting said auxiliary exhaust cam with the scroll to which the inlet closing cam is connected whereby the advance position of said auxiliary exhaust cam is limited by the position of said scroll.

3. A valve gear for reversible piston operated elastic fluid engines having two inlet valves and corresponding exhaust valves, said gear comprising two inlet cams, one of said cams operating to control the opening of the inlet valves for one direction of operation and the closing for the opposite direction of operation and the other cam operating to control the closing of the valves for the first direction and the opening for the second direction, a cam shaft carrying said cams loosely fitted thereon, a screw thread on said cam shaft, two scrolls mounted on the screw threads, means operatively connecting one scroll to one cam and the other scroll to the other cam, two shifting collars respectively mounted one on each of said scrolls, a reversing crank shaft, links connecting the cranks of the crank shaft to the shifting collars on the scrolls, a lost motion mechanism between each of said collars and each scroll allowing a constant lead to be maintained in both directions of rotation of the engine, rollers arranged around the inlet cams, levers connecting the rollers to the respective valves and pressing said rollers against the cam profiles with the full forces caused by the motion of the valves, springs between the scroll connected to the said inlet closing cam and its respective shifting collar to assist the accelerating forces caused by the roller pressure against the closing profile during closure of the inlet valves to maintain the inlet closing cam in its most advanced position to the extent permitted by the lost motion mechanism, springs between the scroll connected with the inlet opening valve and its respective shifting collar to maintain the inlet opening valve in the most lagging position to the extent permitted by the lost motion mechanism, an exhaust cam carried by said cam shaft and provided with a hub, an auxiliary exhaust cam loosely fitted on said hub, said auxiliary exhaust cam controlling the compression and operating in addition to said first mentioned exhaust cam, and means operatively connecting said auxiliary exhaust cam to the scroll connected to the inlet closing cam whereby the position of the auxiliary cam is determined by said scroll.

ARTURO CAPROTTI.